United States Patent [19]
Sorathia et al.

[11] Patent Number: 5,331,062
[45] Date of Patent: * Jul. 19, 1994

[54] POLYURETHANE-EPOXY INTERPENETRATING POLYMER NETWORK ACOUSTIC DAMPING MATERIAL

[75] Inventors: Usman A. Sorathia, Arnold; William L. Yeager, Queen Anne; Timothy L. Dapp, Bowie, all of Md.

[73] Assignee: The United States of America as represented by the Secretary of the Navy, Washington, D.C.

[*] Notice: The portion of the term of this patent subsequent to Jul. 12, 2011 has been disclaimed.

[21] Appl. No.: 752,248

[22] Filed: Aug. 28, 1991

[51] Int. Cl.$^5$ .................................. C08F 283/04
[52] U.S. Cl. .................. 525/454; 523/400; 524/701; 525/528; 525/903
[58] Field of Search ............... 525/454, 903, 920, 528; 523/400, 454; 524/701

[56] References Cited

U.S. PATENT DOCUMENTS

| | | | |
|---|---|---|---|
| 3,894,169 | 7/1975 | Miller | 428/317.9 |
| 3,941,725 | 3/1976 | Schmitter et al. | 521/116 |
| 4,302,553 | 11/1981 | Frisch et al. | 525/903 |
| 4,613,543 | 9/1986 | Dabi | 521/137 |
| 4,766,183 | 8/1988 | Rizk et al. | 525/454 |
| 9,923,934 | 5/1990 | Werner | 525/903 |

Primary Examiner—John Kight, III
Assistant Examiner—John M Cooney, Jr.
Attorney, Agent, or Firm—Gary G. Borda; Luther A. Marsh

[57] ABSTRACT

Improved acoustic damping materials comprise interpenetrating polymer networks having a soft polymer component and a hard polymer component. The soft polymer component, constituting from 50 to 90 percent by weight of the material, is a polyurethane made by polymerization of a diisocyanate with a polyether glycol, and the hard polymer component is made by polymerization of bisphenol A diglycidyl ether, with boron trichloride amine complex as a curing agent.

13 Claims, 3 Drawing Sheets

POLYURETHANE-EPOXY INTERPENETRATING POLYMER NETWORK ACOUSTIC DAMPING MATERIAL

The invention described herein may be manufactured and used by or for the Government of the United States for governmental purposes without the payment of any royalties thereon or therefor.

BACKGROUND OF THE INVENTION

1. Field of Invention

This invention relates to polymer compositions, and methods of preparing them, having improved acoustic damping properties. More specifically, it relates to polymer mixtures comprising two components, a soft polymer component and a hard polymer component, which are intimately mixed on a molecular scale, such mixtures being referred to as "interpenetrating polymer networks."

2. Description of the Prior Art

Interpenetrating polymer networks having improved acoustic damping characteristics are known to the art.

U.S. Pat. No. 3,833,404 discloses interpenetrating polymer networks to be used for surface layers or coatings for damping vibrations or noise-emitting surfaces. The material consists of poly ethylacrylate cross-linked with a polyglycol dimethacrylate, and polystyrene cross-linked with divinylbenzene.

U.S. Pat. No. 4,302,553 discloses a number of interpenetrating polymer networks having improved tensile strength and swelling properties in presence of solvents, including combinations of polyurethanes with polyacrylates, polyepoxides, polyesters, styrene-butadiene polymers and polydimethyl siloxanes.

U.S. Pat. No. 4,342,793 describes curable resin compositions for protective surface coatings consisting of interpenetrating polymer networks prepared from saturated polyols, acrylate and methacrylate esters, and polyisocyanates, by radiation and thermal curing.

U.S. Pat. Nos. 4,618,658 and 4,719,268 describe polymer modified epoxy resin compositions comprising the copolymerization product of an epoxy resin wherein part of the epoxide groups have been modified to provide polymerizable ethylenic unsaturation; vinyl-terminated urethane oligomer; and a polymerizable ethylenically unsaturated compound such as styrene or an acrylate ester.

U.S. Pat. No. 4,742,128 discloses compositions for molded products consisting of an interpenetrating polymer network comprising a polyamide and a polyurethane.

U.S. Pat. No. 4,752,624 describes an interpenetrating polymer network for selective permeation membranes comprising a hydrophilic and a hydrophobic polymer component. The hydrophylic component is made from hexamethylene diisocyanate and polyethylene ether glycol, and cross-linked with trimethylolpropane. The hydrophobic polymer component is polystyrene cross-linked with divinylbenzene.

U.S. Pat. No. 4,766,183 discloses a heat-curable composition comprising a urethane/epoxy/silicone interpenetrating polymer network.

U.S. Pat. No. 4,824,919 describes vinyl ester/styrene composition flexibilized by the addition of a small amount of polyurethane.

U.S. Pat. No. 4,902,737 discloses a resin having improved impact properties comprising an aromatic carbonate resin/polyester blend modified by the addition of a first elastomeric phase of cross-linked polyacrylate, and a second phase of cross-linked styrene/acrylonitrile.

U.S. Pat. No. 4,923,934 discloses a coating having improved flexibility, resistance to chemical attack and corrosion, and adhesion, consisting of an interpenetrating polymer network including a blocked urethane prepolymer, a polyol, an epoxy resin, and an epoxy catalyst.

U.S. Pat. No. 4,957,981 describes a polymeric material to be used for optical products such as lenses, goggles, and watch covers comprising an interpenetrating polymer network of a polyol(allylcarbonate) and an epoxy resin.

U.S. Pat. No. 4,992,506 provides a molding composition having improved flexural modulus and softness (lower modulus) comprising an interpenetrating polymer network of one or more thermoplastic copolyetheresters, one or more aromatic thermoplastic polyesters, a rubbery polymer comprising cross-linked (meth)acrylate, and an interpenetrating cross-linked styrene resin; and, optionally, a mineral filler.

SUMMARY OF THE INVENTION

The acoustic damping properties of viscoelastic polymeric materials render them most effective in their glass transition temperature range where the material changes from hard, glass-like to soft, rubbery consistency. For a particular polymeric material, the glass transition temperature range is centered about a characteristic temperature for that material. For most polymeric materials, the glass transition temperature range is on the order of 20 degrees C. (see curve labeled 100/0 in FIG. 2). This temperature range is where the polymeric material provides its maximum acoustic damping, however, it frequently occurs at temperatures which are either lower or higher than the temperature range in which a high degree of acoustic damping is desired from an applications standpoint. Efforts have therefore been made to broaden the glass transition temperature range and to shift it to a designated temperature range such that a high degree of acoustic damping is achieved at temperatures at which acoustic damping ordinarily is low. The present invention provides a viscoelastic material interpenetrating polymer network having a broadened glass transition temperature range and, therefore, improved acoustic damping over a broad range of temperatures (see curves labeled 90/10, 80/20, 70/30 and 50/50 in FIGS. 1-2). Furthermore, by adjusting the relative weight percentages of the polymer components, the temperature range over which maximum acoustic damping is achieved can be varied to a desired temperature level (see FIGS. 1-3).

The ability of viscoelastic materials to dampen noise and vibration is related to their complex Young's modulus $$E^* = E' + iE'',$$

where $E'$ is the real, elastic, or in-phase modulus, and $E''$ is the imaginary, viscous, loss, or out-of-phase modulus; $i = \sqrt{-1}$. A measure of the mechanical energy dissipation as heat in a viscoelastic material is the ratio $E''/E'$, which is also referred to as the damping factor, tangent delta. It is experimentally determined at 10 Hz with a mechanical thermal analyzer, such as the Polymer Laboratory Dynamic Mechanical Thermal Analyzer. All polymer systems exhibit a maximum value for tan delta, and hence maximum vibration damping efficiency, in their glass transition temperature range.

Interpenetrating polymer networks are chemically dissimilar cross-linked polymer chains which have substantially no chemical bonding between them. They are prepared by allowing two sets of polymer precursors to polymerize in each other's presence, either simultaneously or sequentially, whereby two cross-linked polymer networks form which are intimately entangled with each other on a molecular scale.

It has been found that, by the choice of appropriate polymer components and polymer component ratios, interpenetrating polymer networks may be produced whose glass transition temperature range is broadened and shifted to a preferred temperature range. Such interpenetrating polymer networks, as for example the interpenetrating polymer networks of the present invention, have increased acoustic damping factors in the temperature range in which the polymers are to be used for acoustic damping.

The object of this invention therefore is to provide interpenetrating polymer networks having broadened glass transition temperature ranges and increased acoustic damping factors at designated temperature levels. The invention provides a tunable interpenetrating polymer network acoustic damping material exhibiting superior acoustic damping properties from a low temperature to a high temperature without the necessity of changing polymer components for different uses at different temperatures. A further object of this invention is to provide processes for preparing such interpenetrating polymer networks.

One component of the interpenetrating polymer networks of this invention is a soft polymer, and the other component is a hard polymer. The soft polymer component of the interpenetrating polymer network of this invention is a polyurethane prepared from one or several diisocyanates and a polyalkylene ether glycol, cross-linked using a polyol. The diisocyanates most commonly used are 4,4'-diphenylmethane diisocyanate, and 2,4 and 2,6-toluene diisocyanate, the latter two most commonly as an isomer mixture. Polyalkylene ether glycols such as polyethylene ether glycols, polpropylene ether glycols, and polytetramethylene ether glycols may be used, the latter, with a molecular weight from about 650 to about 2000, being preferred. The polyurethane precursors are polymerized in the presence of their chain extender and cross-linking agent. As a chain extender, 1,4-butanediol is preferred. Cross-linking is achieved by the addition of 1,1,1-trimethylol propane.

The hard component of the polymer system is an epoxy polymer produced by polymerizing the diglycidyl ether of a polyphenol such as 2,2-bis(4-hydroxyphenyl)propane (bisphenol A), 4,4'-dihydroxy diphenyl methane, 4,4'-dihydroxy benzophenone, and 1,1-bis(4-hydroxyphenyl) ethane. The epoxy polymer precursors are polymerized in the presence of a curing agent. Boron trichloride amine complex is used as a curing agent. The mixture is then cured at between 100 and 120 degrees C. from 12-20 hours. The interpenetrating polymer network has an extended glass transition range when the weight percentage of soft polymer component ranges from 50 to 90, and that of the hard polymer component ranges from 50 to 10. Broadened glass transition temperature is achieved by virtue of the epoxy polymer being cross-linked in the presence of polyurethane, but without chemical interference by the polyurethane, to produce microphase separation between the polyurethane and epoxy components. The polyurethane precursors are polymerized in the presence of their chain extender and cross-linking agent and the epoxy polymer precursors are polymerized in the presence of their curing agent, however, no cross-linking results between the polyurethane and the epoxy polymer. This result produces a morphology of polymer networks with microphase domains and entanglement on a molecular scale that produce broad glass transition temperatures. The results is a polyurethane/epoxy interpenetrating polymer network having superior acoustic damping characteristics over a broad temperature range. Thus the invention allows damping from a low temperature to a high temperature without the necessity of changing materials for different uses in different temperature ranges.

DESCRIPTION OF PREFERRED EMBODIMENTS OF THE INVENTION

In the detailed description of the preferred embodiments of this invention, the following abbreviations will be used to identify the materials used:

Isonate 125M, 4,4'-diphenylmethane diisocyanate, Dow Chemical

Polyols T-650, poly tetramethylene ether glycol, molecular weight 650 T-1000, poly tetramethylene ether glycol, molecular weight 1000 T-2000, poly tetramethylene ether glycol, molecular weight 2000 all from DuPont BDO, 1,4-butanediol, DuPont TMP, 1,1,1-trimethylol propane DER 332, epoxy resin, Dow Chemical DY9577, boron trichloride amine complex, Ciba-Geigy

EXAMPLE 1

Figure 1:
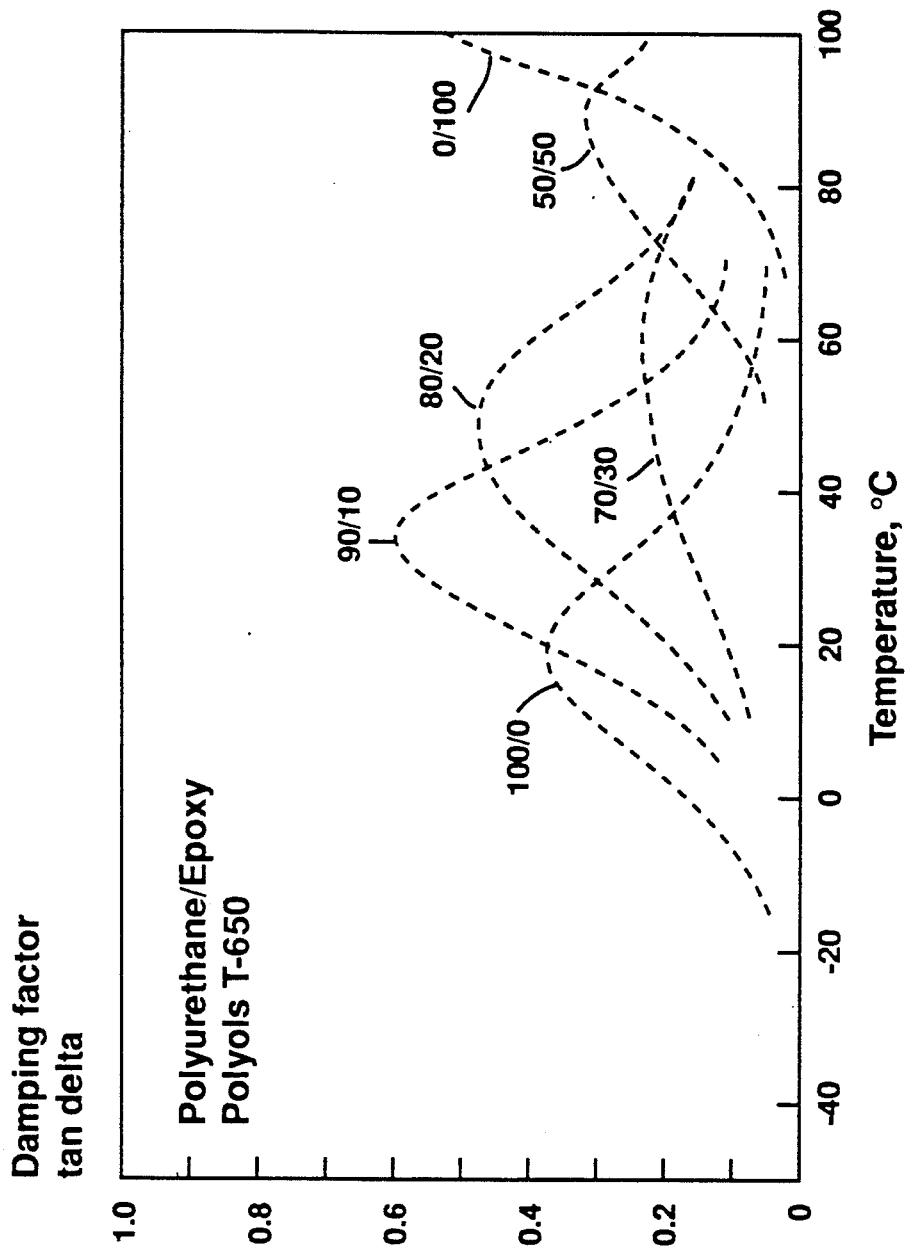
FIG. 1 illustrates the acoustic damping factor, tangent delta, as a function of temperature, for interpenetrating polymer networks in accordance with this invention, as well as for the pure polyurethane and epoxy polymers, for polytetramethylene ether glycol having a molecular weight of about 650.

This example illustrates the preparation of pure polyurethane polymer. 13.8 parts of Polyols T-650 are dried by heating to 100–110 degrees C. and being held under vacuum for about an hour; and cooled to 70 degrees C. 11 parts of Isonate 125M preheated to 50 degrees C. are added with agitation and held under vacuum for ten minutes. 0.2 parts of TMP and 1.5 parts of BDO are added with agitation continuing for five minutes, or until the mixture temperature rises to 75 degrees C. The mixture is cured in a mold for four hours at 110 degrees C., cooled to room temperature, removed from the mold, and post-cured at 110 degrees C. for 16 hours. The damping factor, tangent delta, for this polymer is shown in FIG. 1 as a function of temperature with the identification "100/0". It peaks at 18 degrees C. and is relatively low over the entire temperature range.

EXAMPLE 2

This examples illustrates the preparation of pure epoxy polymer. 20 parts of DER 332 are dried by heating to 70 degrees C. and being held under vacuum for an hour. One part of DY9577 is added and the mixture is agitated for five minutes. The mixture is poured into a mold and cured at 110 degrees C. for 16 hours. The damping factor, tangent delta, for this polymer is shown in FIG. 1 with the identification "0/100". It is seen to be very low up to about 80 degrees C.

EXAMPLE 3

This example illustrates the preparation of an interpenetrating polymer network having the weight ratio of polyurethane to epoxy of 80/20. 13.8 parts of Polyols T-650 are dried by heating to 100-110 degrees C. and being held for an hour under vacuum; and cooled to 70 degrees C. 11 parts of Isonate 125M and 6.3 parts of DER 332, both preheated to 50 degrees C., are added with agitation continuing for 10 minutes under vacuum. 0.2 parts of TMP, 1.5 parts of BDO, and 0.33 parts of DY9577 are added with agitation continuing for 5 minutes or until the mixture reaches 75 degrees C. The mixture is poured into a mold and cured for 12 to 20 hours at 100 to 120 degrees C. Preferably, it is cured for four hours at 110 degrees C., cooled, taken out of the mold, and post-cured at 110 degrees C. for 16 hours. The damping factor, tangent delta, for this interpenetrating polymer network is shown in FIG. 1 with the identification "80/20". It is seen to peak about 46 degrees C. and have a broad temperature range in which the damping factor is high.

EXAMPLES 4, 5, 6, and 7

The preparation of interpenetrating polymer networks having weight ratios of polyurethane to epoxy of 90/10, 70/30, 60/40, and 50/50 follows the same procedure as in Example 3 above, with the weight ratios of ingredients appropriately adjusted. The damping factors, tangent delta, for these interpenetrating polymer networks are shown in FIG. 1. The 90/10 and 70/30 interpenetrating polymer networks are seen to have relatively high damping factors from room temperature to about 70 degrees C. The 60/40 and 50/50 interpenetrating polymer networks have damping factors which peak above 70 degrees C.

EXAMPLES 8, 9, 10, 11, 12, and 13

Figure 2:
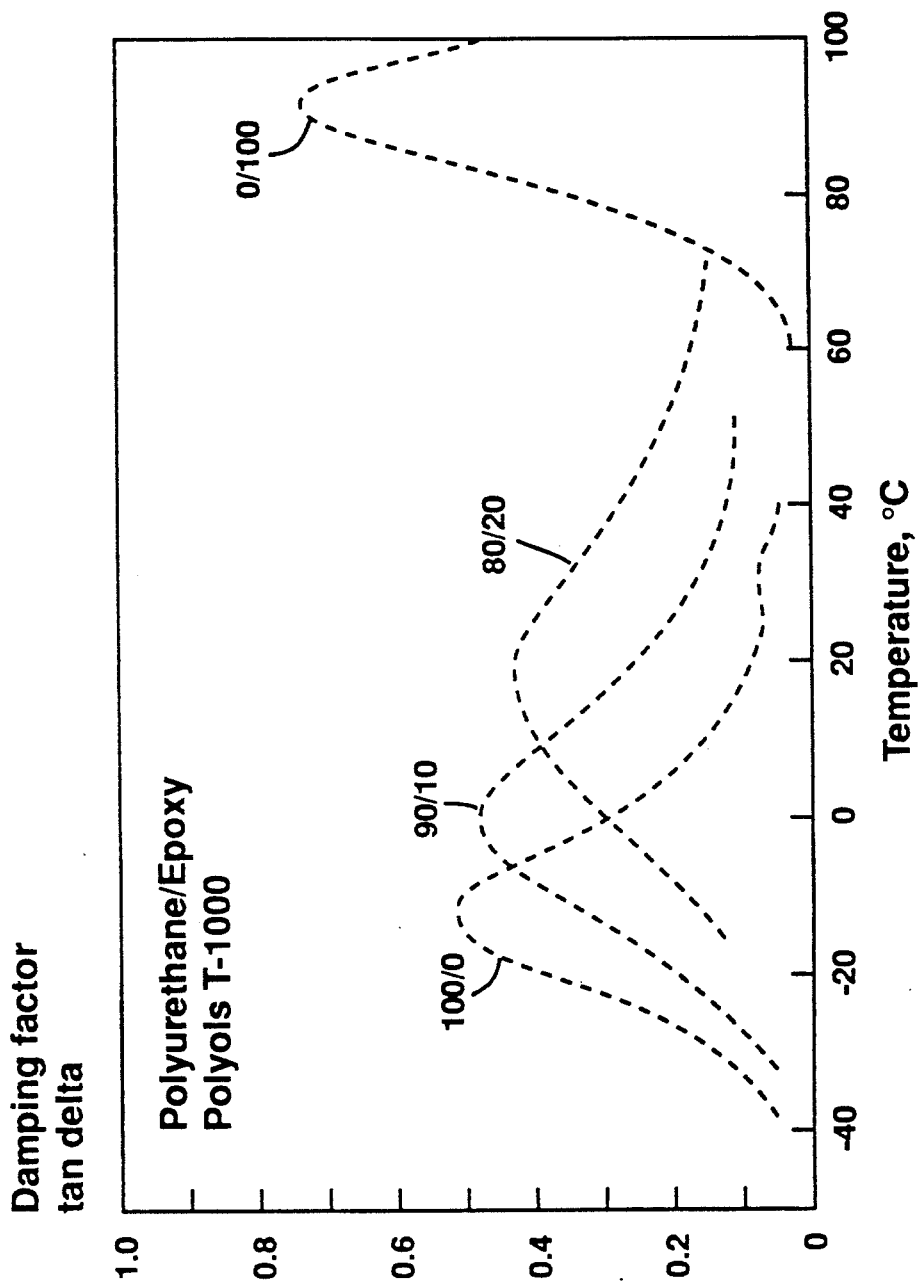
FIGS. 2 and 3 illustrate the damping factors as a function of temperature for polytetramethylene ether glycols having molecular weights of about 1000 and 2000, respectively.

The preparation of pure polymers and interpenetrating polymer networks using Polyols T-1000 is repeated as described in Examples 1-7 above, the weight ratio of diisocyanate to polyol being such that the equivalent ratio of diisocyanate to polyol is substantially the same as in Examples 1-7, as more fully discussed below. FIG. 2 illustrates the damping factor, tangent delta, of these polymers and interpenetrating polymer networks. The interpenetrating polymer networks identified as "90/10" and "80/20" are seen to have the highest damping factors from room temperature to about 70 degrees C.

EXAMPLES 14, 15, 16, 17, and 18

Figure 3:
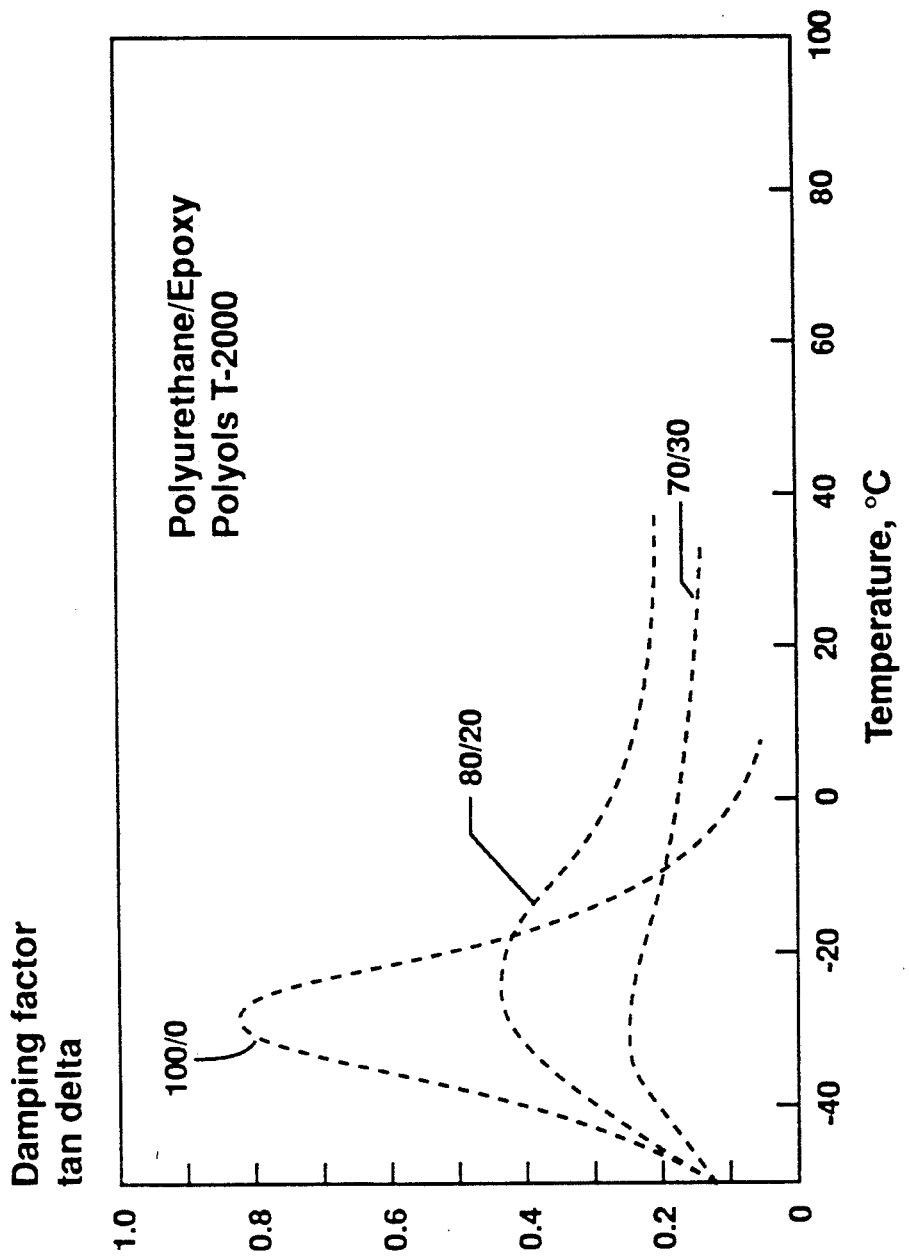

The preparation of pure polymers and interpenetrating polymer networks using Polyols T-2000 is repeated as described in Examples 1-7 above, the weight ratio of diisocyanate to polyol being such that the equivalent ratio of diisocyanate to polyol is substantially the same as in Examples 1-7, as more fully discussed below. FIG. 3 illustrates the damping factor, tangent delta, of these polymers and interpenetrating polymer networks. The interpenetrating polymer networks identified as "80/20" and "70/30" are seen to have the highest damping factors from room temperature to about 70 degrees C.

In the eighteen examples above, the ingredient ratios for making the soft polymer component are best summarized in terms of their hydroxyl and isocyanate equivalents and equivalent ratios. Isonate 125M, with a molecular weight of 250 and two isocyanate groups per molecule, has an equivalent weight of 125. Polyols T-650, T-1000 and T-2000, with two hydroxyl groups per molecule, have equivalent weights of 325, 500, and 1000, respectively. BDO, with a molecular weight of 90 and two hydroxyl groups per molecule, has an equivalent weight of 45. TMP, with a molecular weight of 134 and three hydroxyl groups per molecule, has an equivalent weight of 44.7. For the examples above illustrating the preferred embodiments of this invention, the preferred ranges of equivalent ratios of Polyols, BDO, and TMP to diisocyanate are summarized by the following table.

Table 1

| Equivalent Ratios of Soft Polymer Component Ingredients | |
| --- | --- |
| Equivalent Ratio | Preferred Range |
| Polyols/diisocyanate | 0.45-0.50 |
| BDD/diisocyanate | 0.35-0.40 |
| TMP/diisocyanate | 0.05-0.06 |

The weight ratio of hard polymer components, epoxy resin to curing agent, ranges from 19 to 21. The weight ratio of soft polymer components (diisocyanate, Polyols, BDO, plus TMP) to hard polymer components (epoxy resin plus curing agent) ranges from 1 to 9.

Other modifications of this invention will be apparent to those skilled in the art, all falling within the scope of the invention as described herein and claimed in the following claims.

What is claimed is:

1. A process for preparing an improved acoustic damping material consisting of an interpenetrating polymer network of a soft polymer component made of polyurethane and a hard polymer component made of an epoxy polymer, comprising the steps of:

mixing in a predetermined ratio a soft polymer component and a hard polymer component, wherein the constituents of said soft polymer component comprise an aromatic diisocyanate, a previously dried polyalkylene ether glycol, a chain extender, and a cross-linking agent, said constituents of said soft polymer component having the following ratios in equivalents, said dried polyalkylene ether glycol to said aromatic diisocyanate being from about 0.45:1 to about 0.50:1, said chain extender to said aromatic diisocyanate being from about 0.35:1 to about 0.40:1, and said cross-linking agent to said aromatic diisocyanate being from about 0.05:1 to about 0.06:1, and wherein the constituents of said hard polymer component comprise an epoxy resin and a curing agent, the ratio by weight of said epoxy resin to said curing agent being from about 19:1 to about 21:1, and further wherein the predetermined ratio of said soft polymer component to said hard polymer component is from about 1:1 to about 9:1 by weight; and curing the mixture for from 12 to 20 hours at from 100 to 120 degrees C.

2. A process in accordance with claim 1 in which the aromatic diisocyanate is selected from the group consisting of 4,4'-diphenylmethane diisocyanate, 2,4-toluene diisocyanate, 2,6-diisocyanate, and any mixture thereof.

3. A process in accordance with claim 1 in which the polyalkylene ether glycol is selected from the group consisting of polyethylene ether glycol, polypropylene ether glycol, and polytetramethylene ether glycol.

4. A process in accordance with claim 3 in which the polytetramethylene ether glycol has a molecular weight from about 650 to about 2000.

5. A process in accordance with claim 1 in which the chain extender is 1,4-butanediol and the cross-linking agent is 1,1,1-trimethylol propane.

6. A process in accordance with claim 1 in which the epoxy resin is a polyglycidyl ether epoxide of a polyphenol.

7. A process in accordance with claim 6 in which the polyphenol is selected from the group consisting of 2,2-bis(4-hydroxyphenyl)propane, 4,4'-dihydroxy diphenylmethane, 4,4'-dihydroxy benzophenone, and 1,1-bis(4-hydrophenyl)ethane.

8. A process in accordance with claim 1 in which the curing agent is boron trichloride amine complex.

9. An improved acoustic damping material comprising an interpenetrating polymer network of a soft polymer component made of polyurethane and a hard polymer component made of an epoxy polymer and having a predetermined ratio of soft polymer component to hard polymer component prepared in accordance with the process of claim 1.

10. A process for making an improved acoustic damping material consisting of an interpenetrating polymer network of a soft polymer and a hard polymer, comprising the steps of:
   drying a polyalkylene ether glycol by heating said polyalkylene ether glycol in a vacuum to about 100 to110 degrees C.;
   holding said heated polyalkylene ether glycol at said about 100 to 110 degrees C. in a vacuum for about 1 hour;
   cooling said polyalkylene ether glycol to about 70 degrees C.;
   measuring in a predetermined ratio the components of said soft polymer and the components of said hard polymer, said components of said soft polymer comprising an aromatic diisocyanate, said dried polyalkylene ether glycol, a chain extender and a cross-linking agent, wherein the ratio in equivalents of said components of said soft polymer are as follows, said dried polyalkylene ether glycol to said aromatic diisocyanate is from about 0.45:1 to about 0.50:1, said chain extender to said aromatic diisocyanate is from about 0.35:1 to about 0.40:1, and said cross-linking agent to said aromatic diisocyanate is from about 0.05:1 to about 0.06:1, said components of said hard polymer comprising an epoxy resin and a curing agent, wherein the ratio by weight of said epoxy resin to said curing agent is from about 19:1 to about 21:1, and further wherein the predetermined ratio of said soft polymer components to said hard polymer components is from about 1:1 to about 9:1 by weight;
   in a vacuum, mixing said aromatic diisocyanate and said epoxy resin, both said aromatic diisocyanate and said epoxy resin having been preheated to about 50 degrees C., with said dried polyalkylene ether glycol with agitation of the mixture continuing for about 10 minutes;
   adding said cross-linking agent, said chain extender and said curing agent to said mixture with agitation continuing until the resulting mixture reaches about 75 degrees C.;
   pouring said resulting mixture into a mold;
   letting said resulting mixture cure for about 4 hours at about 110 degrees C.;
   removing said resulting mixture from the mold; and
   post-curing said mixture for about 16 hours at about 110 degrees C.

11. A process as in claim 10 wherein said aromatic diisocyanate is selected from the group consisting of 4,4'-diphenylmethane diisocyanate, 2,4-toluene diisocyanate, 2,6-diisocyanate, and a mixture thereof, and further wherein said polyalkylene ether glycol is selected from the group consisting of polyethylene ether glycol, polypropylene ether glycol, and polytetramethylene ether glycol, said polytetramethylene ether glycol having a molecular weight from about 650 to about 2000.

12. A process as in claim 11 wherein said epoxy resin is a polyglycidyl ether epoxide of a polyphenol.

13. A process as in claim 12 wherein said chain extender is 1,4-butanediol, said cross-linking agent is 1,1,1-trimethylol propane, and said curing agent is boron trichloride amine complex.

* * * * *